(12) United States Patent
Myron et al.

(10) Patent No.: US 11,812,290 B2
(45) Date of Patent: Nov. 7, 2023

(54) USING MACHINE LEARNING TO OPTIMIZE WIRELESS CARRIER SYSTEM TESTING

(71) Applicant: T-Mobile USA, Inc., Bellevue, WA (US)

(72) Inventors: Peter P. Myron, Fall City, WA (US); Michael J. Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 129 days.

(21) Appl. No.: 17/555,770

(22) Filed: Dec. 20, 2021

(65) Prior Publication Data

US 2023/0199530 A1      Jun. 22, 2023

(51) Int. Cl.
*H04W 24/06*      (2009.01)

(52) U.S. Cl.
CPC .................................. *H04W 24/06* (2013.01)

(58) Field of Classification Search
CPC .............................. H04W 24/00; H04W 24/06
See application file for complete search history.

(56) References Cited

U.S. PATENT DOCUMENTS

| | | | | |
|---|---|---|---|---|
| 11,500,761 B1* | 11/2022 | Arguelles | .............. | G06F 11/368 |
| 11,573,885 B1* | 2/2023 | Eizenman | ............ | G06N 3/0464 |
| 2019/0235997 A1* | 8/2019 | Mitchell | .................. | G06N 7/01 |
| 2023/0004486 A1* | 1/2023 | Drozhak | ............... | G06F 11/368 |
| 2023/0083011 A1* | 3/2023 | Krishnan | ............... | H04W 24/00 |
| | | | | 455/423 |

* cited by examiner

*Primary Examiner* — Hashim S Bhatti
(74) *Attorney, Agent, or Firm* — Lee & Hayes, P.C.

(57) ABSTRACT

Described herein are techniques, devices, and systems for using a machine learning model(s) and/or artificial intelligence algorithm(s) to optimize testing of components of a system operated by a wireless carrier. For example, data generated as a result of executing a first test of a suite of tests may be provided as input to a trained machine learning model(s) to classify one or more tests of the suite of tests as having a particular characteristic. A to-be-executed test may be classified as likely to pass or likely to fail when executed, for example. An already-executed test may be classified as reliable or unreliable, as another example. Based on the classification of the test(s), the suite of tests may be modified to optimize testing of the wireless carrier's system.

18 Claims, 7 Drawing Sheets

USING MACHINE LEARNING TO OPTIMIZE WIRELESS CARRIER SYSTEM TESTING

BACKGROUND

Before being deployed to production, new components of a wireless carrier's system are typically subject to a suite of tests. Even when such tests are reliable at first, over time the tests can become unreliable, and, thus, ineffective for determining the operability of a new component or system (e.g., executing an unreliable test may provide false confidence in the test results, and may ultimately cause deployment of an inoperable component(s)). Further, such tests may be inefficient in that more tests than necessary are executed to determine the operability of a new component or system, and, as a result, it may take a longer time than necessary to complete a suite of tests. Moreover, complex tests are difficult to setup, and, because they typically execute for a relatively long duration, a high amount of computing resources may be consumed when such tests are executed. In addition, the existing practice of hiring contractors to conduct tests of a wireless carrier's system is prone to user error, among other issues associated with a testing process that is reliant on humans for test execution.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
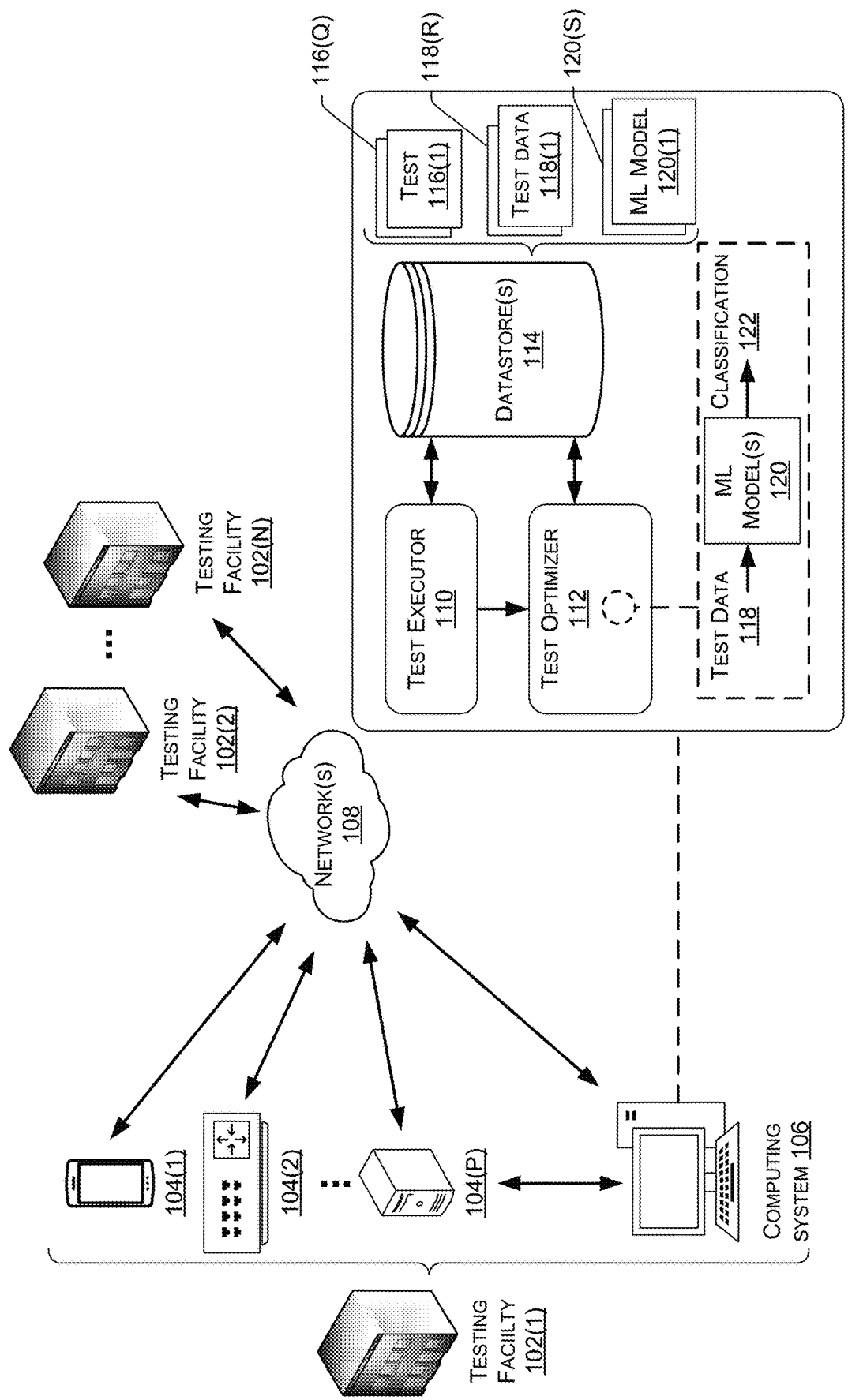
FIG. 1 illustrates an example environment that may be configured to implement the techniques described herein for using a trained machine learning model(s) to optimize testing of a wireless carrier's system, in accordance with various embodiments.

Described herein are, among other things, techniques, devices, and systems for using a trained machine learning model(s) and/or artificial intelligence algorithm(s) to optimize testing of components of a system operated by a wireless carrier. The wireless carrier, may deploy, maintain, and/or operate various components of a system at various stages, and/or on an ongoing basis. These components can include, for example, user equipment (UE), such as mobile phones (e.g., smart phones, handsets, etc.) and/or other user devices, network equipment, such as components of a radio access network (RAN) (e.g., an E-UTRAN Node B (eNodeB or eNB), a Next Generation Node B (gNB), etc.), components of an Internet Protocol Multimedia Subsystem (IMS) core, components of a fifth generation (5G) system, components of a legacy system (e.g., a fourth generation (4G) Long Term Evolution (LTE) system), components of a bill payment system, components of an electronic commerce (e-commerce) system, and the like. Before deployment of such components in the field where the components are to be used for provisioning services to subscribers of the wireless carrier, individual ones of the components may be subject to a suite of tests. Engineers and/or software developers may design such tests, and, in some examples, the execution of such tests may involve executing a script(s) (e.g., a script that emulates user input to a UE) to test the operability (e.g., the availability, performance, etc.) of the component(s) being tested.

The disclosed techniques may be implemented, at least in part, by a computing system associated with one or more testing facilities where components of a system operated by the wireless carrier are tested before their deployment in the field. Initially, a machine learning model(s) and/or artificial intelligence algorithm(s) may be trained to classify individual tests of a suite of tests as one of multiple class labels based on test data generated as a result of executing a test(s) of the suite of tests. For a test that has not yet been executed with respect to a component(s), the output of the trained machine learning model(s) may classify the test as "likely to pass" or "likely to fail," or may otherwise predict the likelihood of the to-be-executed test passing or failing. In this way, the machine learning model(s) may be trained to predict a "necessity" of executing a given test(s). For a test that has already been executed, the output of the trained machine learning model(s) may classify the test as "reliable" or "unreliable," or may otherwise determine the likelihood of the test being "reliable" or "unreliable." Accordingly, the machine learning model(s) and/or artificial intelligence algorithm(s), once trained, may act as a "meta-test" component for predicting a characteristic of a test(s) (e.g., classifying one or more tests of the suite of tests as having a particular characteristic). In some examples, chaos testing may be used to validate whether a test is reliable or unreliable. Chaos testing may involve simulating a component failure by, for example, shutting off a component and/or a function, and executing a test while the component/function is shut off. The metadata resulting from chaos testing can be added to a prediction model of future events to determine whether a test is reliable or unreliable.

In some examples, based on the classification output from the trained machine learning model(s), the suite of tests may be modified to optimize the current testing and/or future testing of a component(s). For example, if the trained machine learning model(s) determines that a test is likely to pass when executed, the suite of tests can be modified by refraining from executing that test (e.g., skipping the test, removing the test from the suite of tests, etc.). In another example, if the trained machine learning model(s) determines, with an above-threshold confidence, that a test is unreliable, the suite of tests may be modified based on the unreliable test, such as by removing the unreliable test and/or by increasing an execution frequency of another, downstream test(s) to compensate for the unreliable test results produced by the unreliable test. Accordingly, a trained machine learning model(s) can be used to optimize the testing of components of a system operated by a wireless carrier, such as by improving the efficiency and/or the quality of testing through automation and machine-learned predictions to produce a suite(s) of tests that are more reliable, more efficient, cheaper to execute, faster to execute, and the like.

In an illustrative example, engineers and/or software developers associated with (e.g., employed or contracted by) a wireless carrier may create a suite of tests to test one or more components of a bill payment system that subscribers of the wireless carrier will use to pay their bills for services relating to the subscribers' voice and/or data plans. To use this bill payment system, a subscriber may login to the bill payment system, such as by navigating a web browser to a Uniform Resource Locator (URL) or launching a mobile application on a UE, entering credentials (e.g., a username, password, etc.), authenticating through multi-factor authentication (MFA), and the like. After logging in to the bill payment system, the subscriber may access a bill from the bill payment system, such as by loading a page with the bill on a UE, downloading the bill to the UE, and the like. The suite of tests may be created to emulate one or more of these steps (e.g., by executing a script on a UE to emulate user input to the UE for logging into the bill payment system, accessing the bill, etc.). Accordingly, the components being tested may be the software that is to be installed on devices for implementing the bill payment system, a UE executing software to receive user input and/or send/receive messages to/from a server, the server executing software to send/receive messages to/from the UE, and/or one or more third-party systems used for authenticating and/or verifying banking information of the subscriber, etc.

In this example, a first test of the suite of tests may be executed to verify that the subscriber is able to login to the bill payment system, and test data may be generated as a result of executing the first test, such as test result data indicating that the first test passed (e.g., if the login attempt was successful). This test data may be provided as input to a machine learning model(s) that is trained to predict whether a second test(s) (e.g., a downstream test, a separate iteration of the first test, etc.) of the suite of tests is likely to pass based at least in part on the first test having passed. For example, an objective of a second, downstream test may be to test another login step for paying a bill, which may be redundant in view of the first test, which involved testing a login to the bill payment system. If the trained machine learning model(s) classifies the second, downstream test as a test that is likely to pass when executed (e.g., if the first login attempt was successful, then a second login attempt is likely to be successful, etc.), the suite of tests can be modified, such as by refraining from executing the second test when it is time to execute the second test. Thus, testing of the bill payment system, in this example, can be optimized by improving the efficiency and/or the speed of the testing. Other examples described herein pertain to predicting other characteristics of tests and optimizing testing in different ways. Accordingly, it is to be appreciated that the above example is merely one exemplary way of using machine learning and/or artificial intelligence to optimize testing of a wireless carrier's system.

An example computer-implemented process may include providing, as input to a trained machine learning model(s), data generated as a result of executing a first test of a suite of tests that are to be executed for testing one or more components of a system operated by a wireless carrier, and classifying one or more tests of the suite of tests as having a particular characteristic using the trained machine learning model(s), and based at least in part on the data. For example, a to-be-executed test may be classified as likely to pass or likely to fail when executed. As another example, the already-executed first test may be classified as reliable or unreliable. Based on the classification of the test(s), the suite of tests can be modified to optimize testing of the wireless carrier's system. Also disclosed herein are systems comprising one or more processors and one or more memories, as well as non-transitory computer-readable media storing computer-executable instructions that, when executed, by one or more processors perform various acts and/or processes disclosed herein.

The disclosed techniques, devices, and systems provide various technical benefits and practical applications. For example, the techniques, devices, and systems described herein can allow for optimizing the testing of a system operated by a wireless carrier, such as by improving the efficiency and/or the quality of testing through automation and machine-learned predictions. In some embodiments, the techniques, devices, and systems described herein may allow one or more devices to conserve resources with respect to processing resources, memory resources, networking resources, power resources, etc., in the various ways described herein. For example, the efficiency of testing can be improved by, for example, shortening the test duration, conserving resources used during testing, etc. For example, resources (e.g., computing resources, time, etc.) can be conserved by refraining from executing a test that is predicted to pass when executed. Furthermore, refraining from executing a test of a suite of tests may allow for completing the suite of tests faster and/or executing a greater number of other tests and/or executing other tests at a higher frequency (e.g., executing multiple instances of another test in parallel) without increasing the total duration of executing the suite of tests. Additionally, or alternatively, the automated testing approach described herein can be used to ensure that components of a system operated by a wireless carrier are operable before they are deployed in the field, thereby improving the reliability of the system operated by the wireless carrier. In one example, the system operated by the wireless carrier is used to implement a telecommunications network of the wireless carrier and/or other systems relating to services provisioned to subscribers via the telecommunications network. Accordingly, the techniques, devices, and systems described herein can provide improved services to subscribers of the wireless carrier.

Although the examples described herein pertain to optimizing testing of components of a wireless carrier's system, it is to be appreciated that the techniques, devices, and systems described herein may be used to optimize testing of any suitable backend, frontend, or middleware component of any type of system. In this sense, the techniques, devices, and systems described herein are broadly applicable to any test suite of software. Additionally, or alternatively, the techniques, devices, and systems described herein may be used for optimizing software-guided hardware test suites.

FIG. 1 illustrates an example environment 100 that may be configured to implement the techniques described herein for using a trained machine learning model(s) to optimize testing of a wireless carrier's system, in accordance with various embodiments. The environment 100 depicted in FIG. 1 may include one or more testing facilities 102. FIG. 1 depicts a plurality of testing facilities 102(1), 102(2), . . . , 102(N) (collectively 102), which may be distributed throughout any suitable geographical area, anywhere in the world, at any scale or level of granularity. An individual testing facility 102 may represent a testing laboratory where one or more components 104 of a system operated by a wireless carrier are to be tested. FIG. 1 depicts a plurality of components 104(1), 104(2), . . . , 104(P) (collectively 104) of a system operated by a wireless carrier that can be tested within the testing facility 102(1).

A wireless carrier (sometimes referred to herein as an "operator", "mobile network operator", "cellular network operator", "telecommunication service provider," etc.) may be associated with the testing facilities 102 of FIG. 1, such testing facilities 102 being used to house components 104 of the wireless carrier's system that are to be tested. The wireless carrier may utilize, operate, and/or maintain a cellular network (sometimes referred to herein as a "telecommunications network" or a "mobile network") for delivering Internet Protocol (IP) multimedia to mobile devices of its subscribers. For example, the wireless carrier may offer multimedia telephony services that allow a subscriber to call or message other users via the cellular network using his/her mobile device. A subscriber can also utilize an associated mobile device to receive, provide, or otherwise interact with various different services by accessing a core network via various network nodes. In this manner, the wireless carrier associated with the testing facilities 102 of FIG. 1 may offer any type of service(s) (e.g., IMS-based services), such as telephony services (or voice calling), emergency services (e.g., E911), gaming services, instant messaging services, presence services, audio/video streaming services, video conferencing services, augmented reality (AR) and/or virtual reality (VR) services, social networking and sharing services, location-based services, push-to-talk services, WiFi calling services, real time text (RTT) services, RTT calling services and/or video calling services, and so on. In at least one example, the components 104 within a testing facility 102 represent components of a system operated by the wireless carrier to provide such services to its subscribers.

Accordingly, an individual component 104 in a testing facility 102 may represent any suitable component that may be implemented in a system operated by a wireless carrier. For example, the components 104 may include, without limitation, UEs, such as mobile phones (e.g., smart phones, handsets, etc.) and/or other user devices, network equipment, such as routers, hubs, access points, components of a RAN (e.g., an eNB), a gNB, etc.), components of an IMS core, such as a proxy call session control function (P-CSCF) node, serving call session control function (S-CSCF) node, a Telephony Application Server (TAS), or the like, as well as components of a 5G system, such as a policy control function (PCF), a session management function (SMF), an access and mobility management function (AMF), an authentication server function (AUSF), a user plane function (UPF), and the like, and/or components of a legacy system (e.g., 4G LTE system), and the like. In some examples, individual ones of the components 104 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), LTE, Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE)—e.g., fourth Generation (4G), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology. In some examples, individual components 104 may be components of a system utilized by subscribers of a wireless carrier, such as a bill payment system and/or an e-commerce system of the wireless carrier. In some examples, individual components 104 may represent hardware components, software components, and/or a combination of hardware and software components. In an example, a wireless carrier's mobile application, which is a software component, may be tested in the testing facility 102(1) by installing the mobile application on a mobile phone 104(1) and/or by using an emulator to execute the mobile application, and then executing a suite of tests while the mobile application is executed in order to test the operability of the mobile application.

A computing system 106 (sometimes referred to herein as a "testing device 106") within the testing facility 102 may be configured to execute a suite of tests with respect to a component(s) 104. FIG. 1 shows that the computing system 106 within the testing facility 102(1) may be communicatively coupled to a network(s) 108. The network(s) 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. FIG. 1 also shows that the components 104 of the testing facility 102(1) may be communicatively coupled to the network(s) 108 and/or to the computing system 106. Further, FIG. 1 shows that respective components 104 and computing systems 106 within other testing facilities 102(2)-(N) may be communicatively coupled to the network(s) 108. In this manner, a computing system 106 within the testing facility 102(1) may remotely execute tests with respect to components 104 that are remotely located at other testing facilities 102(2)-(N) via the network(s) 108, and vice versa. This allows for a versatile and robust testing infrastructure (sometimes referred to herein as a "device farm") where components 104 can be housed within geographically-disparate testing facilities 102 and tested from anywhere, at any time.

As depicted in FIG. 1, the computing system 106 may include one or more components (e.g., software components) to implement the techniques described herein for using a trained machine learning model(s) to optimize testing of a wireless carrier's system, in accordance with various embodiments. For example, the computing system 106 may include, among other components, a test executor 110, a test optimizer 112, and a datastore(s) 114. The test executor 110 may be configured to execute (e.g., conduct, perform, carry out, etc.) tests 116 in order to test one or more components 104 of the wireless carrier's system before they are deployed in the field. Engineers and/or software developers may design such tests 116, and at least some of the tests 116 may be stored in the datastore(s) 114 as tests 116(1)-(Q). Testing objectives may vary. In general, the objective of executing a suite of tests 116 with respect to a component(s) 104 of a system operated by the wireless carrier may be to test the operability of the component(s) 104 to make sure it/they will operate properly in the field before deployment. This operability testing may involve testing the availability of a component(s) 104. For example, if one or more of the components 104 represent a component(s) 104 of a bill payment system, the component(s) 104 of the bill payment system can be tested within the testing facility 102(1) to determine if a user is able to login to the bill payment system and access a bill. Additionally, or alternatively, operability testing may involve testing the performance of a component(s) 104. Continuing with the running example, a component(s) 104 of the bill payment system may be tested to determine how long it takes (e.g., a period of time measured in seconds, milliseconds, etc.) a user to login to the bill payment system and access a bill. In some examples, performance testing may involve executing a test 116 to determine a quality of a network connection (e.g., upload speed, download speed, audio quality of a telephony session, amount of network bandwidth, etc.), and/or whether the quality of the network connection falls below a threshold metric that indicates a poor network connection. In general, execution of a test 116 may involve operating a component(s) 104, such as to browse the Internet, actuate a button(s), provide touch input to a touch screen, send/receive a message(s), and the like. Testing complexity can also vary. For example, some tests 116 can be relatively difficult for test engineers to setup, may involve a large number of steps during execution, and/or may take a relatively long time to execute from start to completion.

In some examples, personnel within the testing facility 102 may help execute at least some of the tests 116. In other examples, tests 116 are fully automated. In some examples, emulators may be utilized for executing tests 116. Emulators may be preferred over testing a real component 104 that is deployable in the field due to the faster speed at which an emulator can be scaled up, as compared to a real component 104, and/or due to the ability to run a large number of emulators in parallel. That is, the individual components 104 tested in the testing facility 102 may represent emulators, in some examples. Furthermore, execution of a test 116 with respect to a component 104 may involve execution of a script(s) (e.g., a script that emulates user input to a UE) to test the operability (e.g., the availability, performance, etc.) of the component 104 being tested.

Whether testing is fully automated or at least partially executed with the assistance of personnel within the testing facility 102, the test executor 110 may be utilized to facilitate the execution of tests 116, or to at least collect data generated as a result of executing tests 116. The data generated as a result of executing tests 116 may be stored in the datastore(s) 114 as test data 118(1)-(R). Test data 118 may include performance data indicative of a performance of one or more components 104 that were tested using a test(s) 116. For example, the performance data may include, or otherwise indicate, a duration of the executed test 116 measured from a start of the test 116 to a completion of the test 116 (potentially in comparison to a baseline duration that is expected for executing the test 116). In some examples, performance data may include, or otherwise indicate, other time-based metrics, such as a response time of a component 104 being tested. Additionally, or alternatively, the performance data may include, or otherwise indicate, non-time-based metrics, such as a quality of a network connection (e.g., upload speed, download speed, etc.), whether the component(s) 104 being tested interacted with a predefined set of other components or systems as a result of executing a test 116, a number of components or systems interacted with over the course of executing a test 116, or the like. As an example, the performance data may include, or otherwise indicate, whether a predefined set of middleware systems, backend systems, and the like, were interacted with by the component(s) 104 being tested. In some examples, the performance data may include, or otherwise indicate, whether a predefined click-path was followed by a script that emulates user input (e.g., clicks of user interface elements presented on webpages and/or mobile applications).

Test data 118 may additionally, or alternatively, include test result data indicative of a test 116 having passed or failed. For example, one or more criteria may be evaluated for a test 116, and the test 116 is deemed to have passed if the criteria are satisfied, else the test 116 fails. In an illustrative example, a test 116 of a component(s) 104 of a bill payment system may pass if a user can successfully login to the bill payment system and access a bill. As another example, a test 116 of a component(s) 104 may pass if the component(s) 104 performs a task or an operation within a threshold amount of time.

Furthermore, the test data 118 may include data in any suitable format, such as text data, image data, audio visual data, audio data, or any other suitable type of data. For example, a component 104 being tested may be a device having a display(s), and the test data 118 generated as a result of executing a test 116 with respect to the device may include image data representing a screenshot of a user interface displayed on the display of the device. As another example, a component 104 being tested may be a device having a speaker(s), and the test data 118 generated as a result of executing a test 116 with respect to the device may include audio data representing a recording of sound output from the speaker of the device. The datastore 114 may represent a data repository that stores data in any suitable format, and that organizes the data in any suitable manner. Over time, as many components 104 are tested, a large amount of test data 118 can be collected and maintained in the datastore 114, some of which may be used to train machine learning models, as described herein.

Accordingly, the test optimizer 112 may be configured to use machine learning and/or artificial intelligence to optimize testing of a wireless carrier's system. For example, the test optimizer 112 may use machine learning and/or artificial intelligence to process the test data 118 and to learn how to predict a characteristic of a test 116 based on the test data 118, and the test optimizer 112 can modify a suite of tests based on the predicted test characteristic in order to optimize testing of a wireless carrier's system.

Machine learning generally involves processing a set of examples (called "training data") in order to train a machine learning model(s) 120(1)-(S). A machine learning model(s) 120, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include test data 118, and the trained machine learning model(s) 120 may be tasked with outputting a classification or a score that indicates, or otherwise relates to, a probability of a test 116 being classified in one of multiple classes that indicate a characteristic of the test 116. For instance, the score output from the trained machine learning model(s) 120 may relate to a probability of the test 116 passing or failing when the test 116 is executed. This "pass" or "fail" classification may be indicative of a necessity of performing the test 116 of a suite of tests 116. That is, if the test 116 is predicted to pass, it may not be necessary to perform the test 116. As another example, the score output from the trained machine learning model(s) 120 may relate to a probability of the test 116 being reliable or unreliable. This "reliable" or "unreliable" classification may be indicative of a validity, efficacy, and/or usefulness of the test 116. In some examples, the machine learning model(s) 120 may be trained to distinguish between a reliable test 116 that generates test results that deviate from normal test results and a test 116 that has become an unreliable test due to changes in test equipment and/or changes to a test environment.

In some embodiments, the score output from the trained machine learning model(s) 120 is a variable that is normalized in the range of [0,1]. In some implementations, the trained machine learning model(s) 120 may output a set of probabilities (e.g., two probabilities), or scores relating thereto, where one probability (or score) relates to the probability of the test 116 having a first characteristic (e.g., likely to pass/fail, when executed), and the other probability (or score) relates to the probability of the test 116 having a second characteristic (e.g., reliable/unreliable). The score that is output by the trained machine learning model(s) 120 can relate to either of these probabilities to indicate a level of confidence that a test 116 has a particular characteristic. The example classifications of "pass or fail" and "reliable or unreliable" are examples of a binary classification task. In some examples, the output from the trained machine learning model(s) 120 may be more granular than a binary (e.g., pass or fail, reliable or unreliable, etc.) classification.

The trained machine learning model(s) 120 may represent a single model or an ensemble of base-level machine learning models, and may be implemented as any type of machine learning model. For example, suitable machine learning models 120 for use by the techniques and systems described herein include, without limitation, neural networks (e.g., deep neural networks (DNNs), recurrent neural networks (RNNs), etc.), tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of machine learning models 120 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The computing system 106, or another computing system, may be configured to train machine learning models using training data, which may represent a sampled subset of the test data 118. In some examples, test data 118 collected from multiple testing facilities 102 can be aggregated, and a sampled subset of the aggregated test data 118 can be used as training data to train machine learning models 120. In general, training data for machine learning can include two components: features and labels. However, the training data used to train the machine learning model(s) 120 may be unlabeled, in some embodiments. Accordingly, the machine learning model(s) 120 may be trainable using any suitable learning technique, such as supervised learning, unsupervised learning, semi-supervised learning, reinforcement learning, and so on. In the case of supervised learning, semi-supervised learning, or the like, the labels included in the training data can be labels such as "pass", "fail", "reliable", "unreliable", or any other label that indicates a characteristic of a test 116 that the machine learning model(s) 120 is tasked with predicting. The features included in the training data can be represented by a set of features, such as an n-dimensional feature vector of quantifiable information about an attribute of the training data. Example features included in the training data may include any suitable quantifiable attribute of the test data 118, such as, without limitation, test results (e.g., pass or fail), test duration (e.g., measured in units of time), performance metrics of components 104 tested (e.g., response time, network connection quality, battery performance, etc.), sensor data obtained by sensors of components 104 being tested, such as device orientation, ambient light levels, and the like, data (e.g., image data) provided by emulators, such as screenshots of emulated results, and/or difference data generated by comparing emulated results (e.g., screenshots of display output produced by emulators) to actual results (e.g., screenshots of display output produced by real components 104). As part of the training process, weights may be set for machine learning. These weights may apply to a set of features included in the training data 120. In some embodiments, the weights that are set during the training process may apply to parameters that are internal to the machine learning model(s) (e.g., weights for neurons in a hidden-layer of a neural network). These internal parameters of the machine learning model(s) 120 may or may not map one-to-one with individual input features of the set of features. The weights can indicate the influence that any given feature or parameter has on the probability that is output by the trained machine learning model 120.

FIG. 1 illustrates the test optimizer 112 using a trained machine learning model(s) 120 to determine a classification 122 associated with a test 116 for purposes of optimizing testing of a wireless carrier's system. In some examples, the trained machine learning model(s) 120 may reside in the cloud (e.g., at a remote location accessible to the computing system 106). For example, the computing system 106 may stream test data 118 to a remote system and receive the classification 122 from the remote system, and/or the computing system 106 may load the trained machine learning model(s) 120 stored at a remote system and use it to generate the classification 122. In the example of FIG. 1, a trained machine learning model(s) 120 may be sent (e.g., downloaded) to the computing device 106 and stored in the datastore(s) 114, and thereafter utilized locally on the computing device 106 for classifying tests 116.

FIG. 1 illustrates that the trained machine learning model(s) 120 may receive and process test data 118 as input, and may generate a classification 122 as output. This may be done in a post-processing algorithm, or in a real-time algorithm, to classify a test 116 as having a particular characteristic. In a post-processing algorithm, the test optimizer 112 may be configured to utilize the trained machine learning model(s) 120 on a scheduled basis (e.g., by periodically inputting test data 118 to the trained machine learning model(s) 120), and/or in response to an event (e.g., upon completion of a suite of tests 116, at the request of a user, etc.). In a real-time algorithm, the test optimizer 112 may be configured to utilize the trained machine learning model(s) 120 while a suite of tests 116 is being executed so that testing can be optimized with respect to the suite of tests 116 in real-time as the suite of tests 116 are executed. For example, the test executor 110 may have started executing a suite of tests 116 with respect to a component(s) 104 of a system operated by a wireless carrier, and the test data 118 provided as input to the trained machine learning model(s) 120 may represent data generated as a result of executing a first test 116(1) of the suite of tests 116. In an example, the test data 118 provided as input to the trained machine learning model(s) 120 can include test result data indicative of the first test 116(1) having passed or failed. In this example, the trained machine learning model(s) 120 may output a classification 122 that classifies a second test 116(2) of the suite of tests 116 as a test that is likely to pass when executed.

The test optimizer 112 is configured to optimize testing of a wireless carrier's system by modifying the suite of tests 116 based on the classification(s) 122 output from the trained machine learning model(s) 120. Continuing with the running example where the trained machine learning model(s) 120 predicted that the second test 116(2) is likely to pass when executed, the test optimizer 112 can modify the suite of tests by causing (e.g., instructing) the test executor 110 to refrain from executing the second test 116(2). This is based on the notion that, if the second test 116(2) is likely to pass when executed, it may be unnecessary to execute the second test 116(2). Accordingly, resources (e.g., computing resources, time, etc.) can be conserved by refraining from executing the second test 116(2), and/or the suite of tests 116 may be completed faster without executing the second test 116(2). The test optimizer 112 can modify a suite of tests 116 in various ways to optimize testing of a wireless carrier's system. In the running example, the test optimizer 112 can label the second test 116(2) with an indicator or a flag that indicates, to the test executor 110, that the second test 116(2) is to be skipped (i.e., the test executor 110 does not execute the second test 116(2)), the test optimizer 112 or the test executor 110 can generate (e.g., fabricate) a test result indicative of the second test 116(2) having passed, even though the second test 116(2) is not executed. Another way of refraining from executing the second test 116(2) may be to remove the second test 116(2) from the suite of tests 116. Although the example described above is an example of classifying a single test 116, it is to be appreciated that more than one test 116 can be classified by the trained machine learning model(s) 120 based on test data 118 provided as input to the trained machine learning model(s) 120. For instance, if a first test 116(1) passed, the trained machine learning model(1) 120 may predict that multiple downstream tests (e.g., the next five tests 116) in the suite of tests 116 are likely to pass.

In another example, the test data 118 provided as input to the trained machine learning model(s) 120 may represent data generated as a result of executing a first test 116(1) of a suite of tests 116, and the trained machine learning model(s) 120 may output a classification 122 that classifies the first test 116(1) as unreliable. For instance, the test data 118 provided as input may include performance data indicative of a performance of the component(s) 104 tested by executing the first test 116(1), and the performance may indicate that the component(s) 104 performed poorly (e.g., that the component(s) 104 took longer than normal to respond to a query, a request, etc.).

In this example, the test optimizer 112 can modify the suite of tests 116 based on the output classification 122, such as by decommissioning the unreliable first test 116(1) and/or removing the unreliable first test 116(1) from the suite of tests 116, flagging the first test 116(1) for engineers to review at a later time, and/or by increasing the execution frequency of one or more other (e.g., downstream) tests 116 in the suite of tests 116, and so on. Accordingly, in at least one example, testing of a wireless carrier's system can be optimized to improve the quality of testing by increasing the execution frequency of certain tests to compensate for an unreliable test 116. Again, the optimization of testing of a wireless carrier's system can be performed in real-time (e.g., on-the-fly, such as by optimizing a suite of tests as it is being executed for purposes of monitoring availability of a service), or in a post-processing algorithm to improve testing on the backend before a next execution of a suite of tests 116.

The classification 122 that is output from the trained machine learning model 120 can be associated with the tests 116 maintained in the datastore 114 and/or validated by human users to re-train the machine learning model(s) 120. Accordingly, the machine learning techniques described herein can improve testing of a wireless carrier's system, which allows for strategic, efficient, and/or cost-effective wireless infrastructure planning and improvement. For example, a wireless carrier can test and deploy components 104 of a system faster and/or more efficiently through the automated machine learning techniques described herein.

In an illustrative example, a wireless carrier (e.g., engineers and/or software developers employed or contracted by the wireless carrier) may create a suite of tests 116 to test one or more components 104 of a bill payment system that subscribers of the wireless carrier will use to pay their bills for services relating to the subscribers' voice and/or data plans. To use this bill payment system, a subscriber may login to the bill payment system, such as by navigating a web browser to a URL or launching a mobile application on a UE, entering credentials (e.g., a username, password, etc.), authenticating through MFA, and the like. After logging in, the subscriber may access a bill from the bill payment system, such as by loading a page with the bill, downloading the bill, and the like. The suite of tests 116 may be created to emulate these steps (e.g., by executing a script on a UE to emulate user input to the UE for logging into the bill payment system, accessing the bill, etc.). For example, a script may be executed to recognize, in the code of a login page, an identifier(s) that identifies a field(s) for entry of a username and/or a password. The script may then be executed to enter a username and/or a password into the identified field(s), and to actuate a displayed "enter" button/icon to attempt a login, and then a timer may be used to test how long it takes for the login to complete. Accordingly, the components 104 being tested may include the software to implement the bill payment system, a UE executing the bill payment system software, a server that sends/receives messages to/from the UE, and/or one or more third-party systems for authenticating and/or verifying banking information of the subscriber, etc.

In this example, the test executor 110 may execute a first test 116(1) of the suite of tests 116 to verify that the subscriber is able to login to the bill payment system, and test data 118 may be generated as a result of executing the first test 116(1). For example, the test data 118 may include test result data indicating that the first test 116(1) passed (assuming the login attempt was successful). The test optimizer 112 can provide this test data 118 as input to a machine learning model(s) 120 trained to predict whether a second test(s) 116(2) of the suite of tests 116 (e.g., a downstream test, a separate iteration of the first test 116(1), etc.) is likely to pass based at least in part on the first test 116(1) having passed. For example, the second test 116(2) may involve another login step for paying a bill, which may be redundant in view of the first test 116(1). If the trained machine learning model(s) 120 classifies the downstream, second test 116(2) as a test that is likely to pass when executed (e.g., if the first login attempt was successful, then a second login attempt is likely to be successful, etc.), the test optimizer 112 can modify the suite of tests 116, such as by causing the text executor 110 to refrain from executing the second test 116(2) when it is time to execute the second test 116(2). Thus, testing of the bill payment system, in this example, can be optimized by improving the efficiency and/or the speed of the testing.

Figure 2:
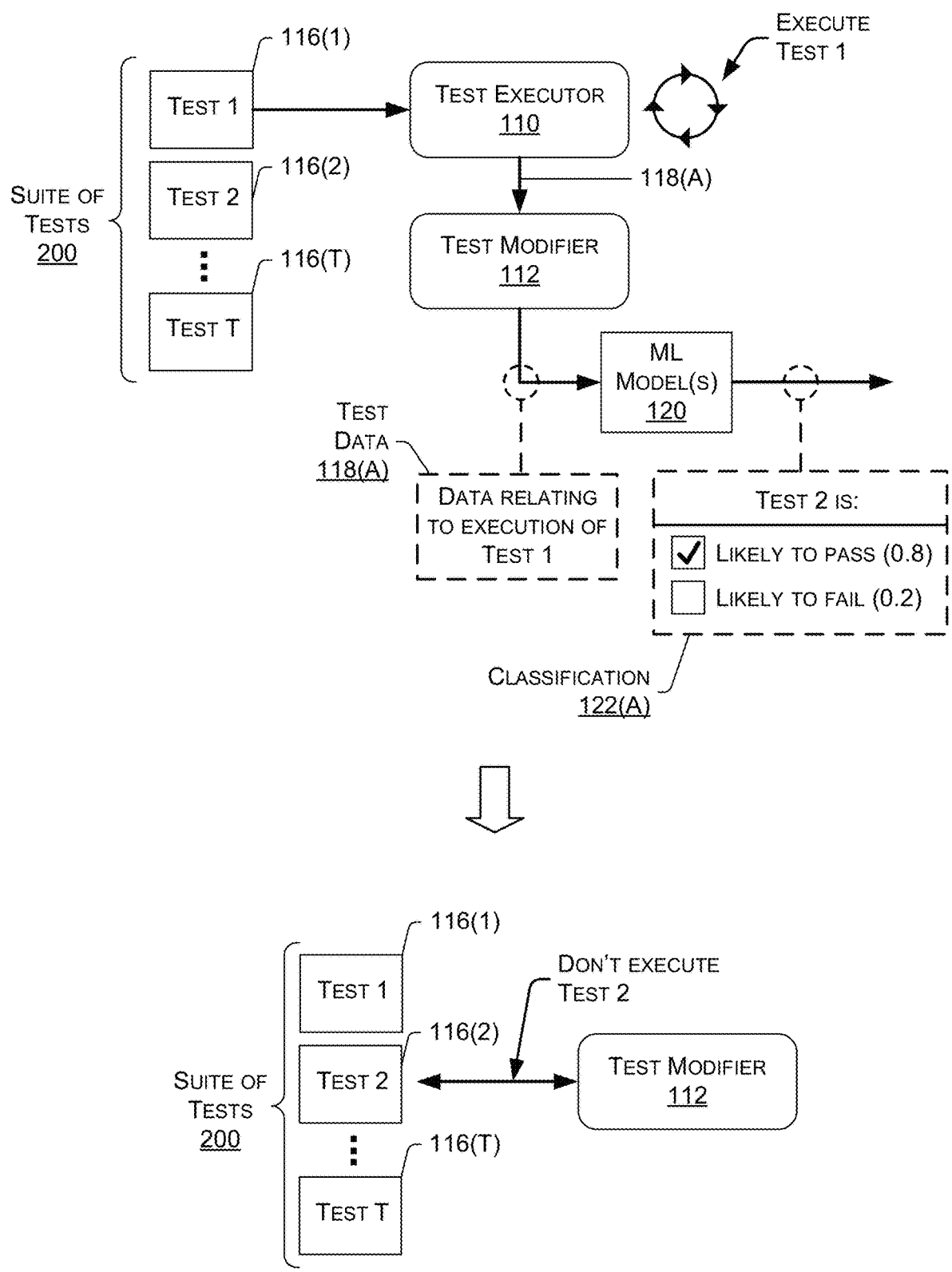
FIG. 2 is an example diagram illustrating a technique for using a trained machine learning model(s) to classify a to-be-executed test of a suite of tests based on data relating to an executed test, and modifying the suite of tests based on the classification of the to-be-executed test, in accordance with various embodiments.

FIG. 2 is an example diagram illustrating a technique for using a machine learning model(s) 120 to classify a to-be-executed test of a suite 200 of tests based on data relating to an already-executed test, and modifying the suite 200 of tests based on the classification of the to-be-executed test, in accordance with various embodiments. In the example of FIG. 2, a suite 200 of tests 116 may include tests 116(1), 116(2), . . . , 116(T). The suite 200 of tests 116 are to be executed for testing one or more components 104 of a system operated by a wireless carrier, as described herein.

FIG. 2 illustrates that the test executor 110 may execute a first test 116(1) ("Test 1") of the suite 200 of tests 116. Test data 118(A) generated as a result of executing the first test 116(1) ("Test 1") may be made accessible to the test modifier 112. For example, the test executor 110 may store the test data 118(A) in the datastore 114 and provide the test modifier 112 with a pointer indicating where the new test data 118(A) is stored.

The test modifier 112 may provide, as input to a trained machine learning model(s) 120, the test data 118(A) generated as a result of executing the first test 116(1) ("Test 1"). In the example of FIG. 2, the trained machine learning model(s) 120 outputs a classification 122(A) that classifies a second test 116(2) ("Test 2") of the suite 200 of tests 116 as a test that is likely to pass when executed. The example classification 122(A) is output as a first score (0.8) that indicates, or otherwise relates to, a probability of the second test 116(2) ("Test 2") passing when the second test 116(2) ("Test 2") is executed, and a second score (0.2) that indicates, or otherwise relates to, a probability of the second test 116(2) ("Test 2") failing when the second test 116(2) ("Test 2") is executed. This "pass" or "fail" classification may be indicative of a necessity of performing the second test 116(2) ("Test 2"). That is, since the second test 116(2) ("Test 2") is predicted to pass (with a confidence score of 0.8 on a scale of [0,1]), it may not be necessary to perform the second test 116(2) ("Test 2") with respect to a component(s) 104 being tested. Although this example is one where the second test 116(2) is different than the first test 116(1), the second test, in some examples, can be the same test as the first test 116(1) (e.g., a separate iteration of the first test 116(1)).

Accordingly, FIG. 2 also illustrates that the test modifier 112 modifies the suite 200 of tests 116 based at least in part on the classification 122(A) output by the trained machine learning model(s) 120. In this example, the modification to the suite 200 of tests 116 may be to cause the test executor 110 to refrain from executing the second test 116(2) ("Test 2") with respect to a component(s) 104 being tested. This may involve labeling or flagging the second test 116(2) ("Test 2") in the suite 200 such that the test executor 110 determines, based on the label or flag associated with the second test 116(2) ("Test 2"), to skip the second test 116(2) ("Test 2"), and to generate (e.g., fabricate) a test result indicative of the second test 116(2) ("Test 2") having assumed to have been passed, even though the second test 116(2) ("Test 2") is skipped. As another example, modifying the suite 200 may involve the test modifier 112 removing the second test 116(2) ("Test 2") from the suite 200 such that the test executor 110 does not execute the second test 116(2) ("Test 2").

Figure 3:
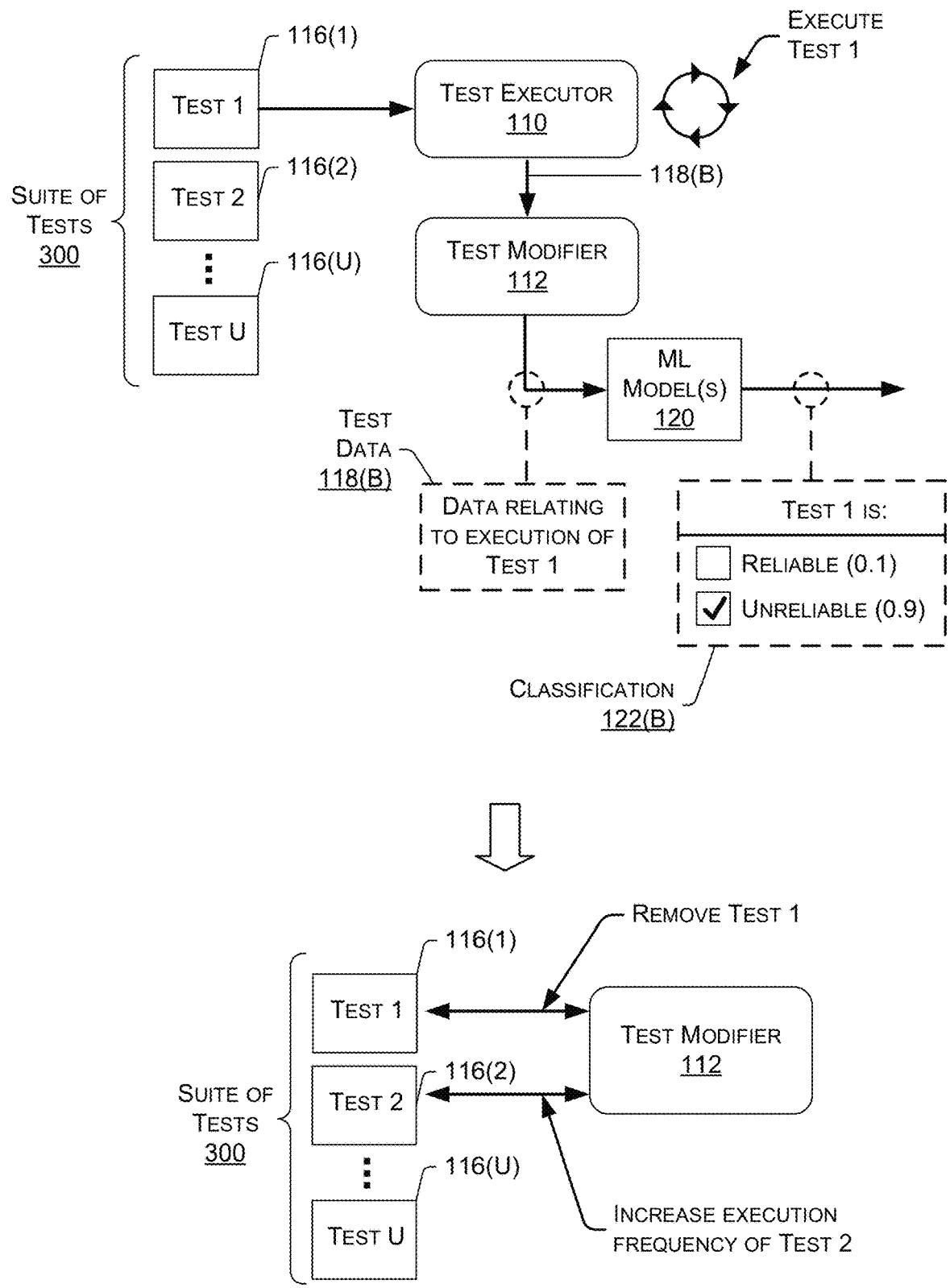
FIG. 3 is an example diagram illustrating a technique for using a trained machine learning model(s) to classify an already-executed test of a suite of tests based on data relating to the already-executed test, and modifying the suite of tests based on the classification of the already-executed test, in accordance with various embodiments.

FIG. 3 is an example diagram illustrating a technique for using a machine learning model(s) 120 to classify an already-executed test of a suite 300 of tests based on data relating to the already-executed test, and modifying the suite 300 of tests based on the classification of the already-executed test, in accordance with various embodiments. In the example of FIG. 3, a suite 300 of tests 116 may include tests 116(1), 116(2), . . . , 116(U). The suite 300 of tests 116 are to be executed for testing one or more components 104 of a system operated by a wireless carrier, as described herein. The suite 300 of tests 116 may be different than the suite 200 of tests 116 described with reference to FIG. 2, or the suites 200 and 300 may represent the same suite of tests 116.

FIG. 3 illustrates that the test executor 110 may execute a first test 116(1) ("Test 1") of the suite 300 of tests 116. Test data 118(B) generated as a result of executing the first test 116(1) ("Test 1") may be made accessible to the test modifier 112. For example, the test executor 110 may store the test data 118(B) in the datastore 114 and provide the test modifier 112 with a pointer indicating where the new test data 118(B) is stored.

The test modifier 112 may provide, as input to a trained machine learning model(s) 120, the test data 118(B) generated as a result of executing the first test 116(1) ("Test 1"). In the example of FIG. 3, the trained machine learning model(s) 120 outputs a classification 122(B) that classifies the first test 116(1) ("Test 1") as unreliable. The example classification 122(B) is output as a first score (0.1) that indicates, or otherwise relates to, a probability of the first test 116(1) ("Test 1") being a reliable test, and a second score (0.9) that indicates, or otherwise relates to, a probability of the first test 116(1) ("Test 1") being an unreliable test. This "reliable" or "unreliable" classification may be indicative of a validity, efficacy, and/or usefulness of the first test 116(1) ("Test 1") in terms of testing the operability of a component(s) 104 of the wireless carrier's system. That is, since the first test 116(1) ("Test 1") is predicted to be unreliable (with a confidence score of 0.9 on a scale of [0,1]) for testing the operability of the component(s) 104 tested using the first test 116(1) ("Test 1"), executing the first test 116(1) ("Test 1") may not be helpful or otherwise effective for testing the operability of the component(s) 104 going forward, and/or the test data 118(B) generated as a result of executing the first test 116(1) ("Test 1") may contribute little-to-no value to the overall assessment of the operability of the component(s) 104. In a non-limiting example, an objective of the first test 116(1) ("Test 1") may be to login to a bill payment system. In this example, an identifier of the password field of a login page may have changed since the first test 116(1) was created. In this example, the first test 116(1) ("Test 1") may no longer be a reliable login test because it cannot recognize the identifier of the password field to complete the login test but it also does not indicate a failure of the system, thus the test is unreliable.

FIG. 3 also illustrates that the test modifier 112 modifies the suite 300 of tests 116 based at least in part on the classification 122(B) output by the trained machine learning model(s) 120. In this example, the modification to the suite 300 of tests 116 may involve the test modifier 112 decommissioning the first test 116(1) ("Test 1") and/or removing the first test 116(1) ("Test 1") from the suite 300 such that the test executor 110 does not execute the first test 116(1) ("Test 1") in the future when the suite 300 is used to test the component(s) 104. Additionally, or alternatively, modifying the suite 300 may involve the test modifier 112 labeling or flagging the first test 116(1) ("Test 1") for engineers to review at a later time. Additionally, or alternatively, modifying the suite 300 may involve the test modifier 112 changing (e.g., increasing) the execution frequency of one or more downstream tests 116, such as the second test 116(2) ("Test 2"), in the example of FIG. 3. In some examples, execution of a downstream test(s) 116, such as the second test 116(2) ("Test 2"), is parallelized by executing multiple instances of the second test 116(2) ("Test 2") under different parameters and/or configurations to test the component(s) 104. This type of modification to the suite 300 of tests 116 may compensate for the unreliability of the first test 116(1) ("Test 1") to help ensure that the operability of the component(s) 104 is adequately tested before deployment of the component(s) 104 in the field.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
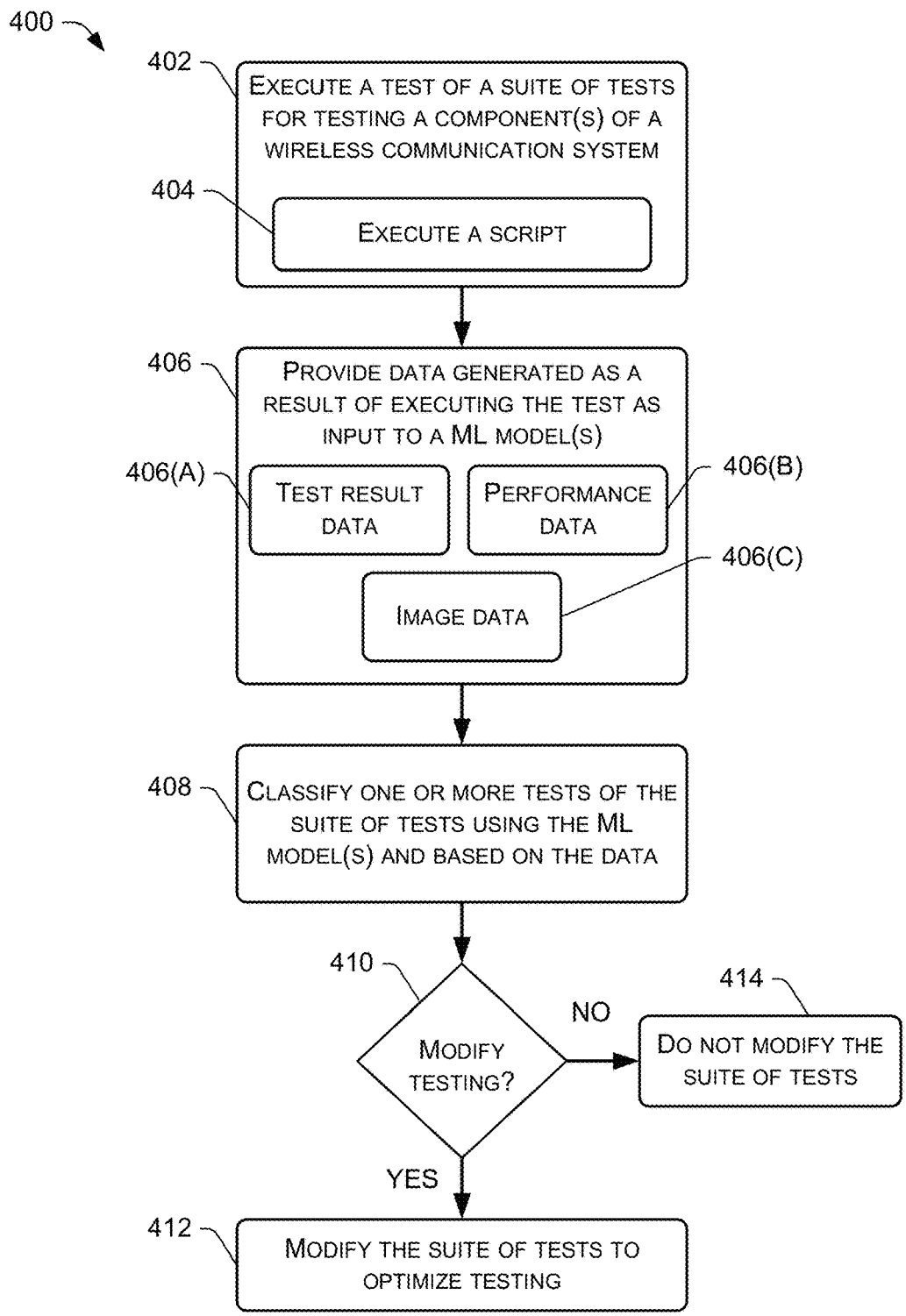
FIG. 4 illustrates a flowchart of an example process for using a trained machine learning model(s) to optimize testing of a wireless carrier's system, in accordance with various embodiments.

FIG. 4 illustrates a flowchart of an example process 400 for using a trained machine learning model(s) 120 to optimize testing of a wireless carrier's system, in accordance with various embodiments. For discussion purposes, reference is made to the previous figure(s) in describing the process 400.

At 402, a computing system (e.g., the computing system 106, etc.) may execute a first test 116(1) of a suite 200, 300 of tests 116 that are to be executed for testing one or more components 104 of a system operated by a wireless carrier. At sub-block 404, the execution of the first test 116(1) may include executing a script. For example, a script may be executed at sub-block 404, such as to emulate user input to a UE. In some examples, the first test 116(1) may be executed to test at least one of an availability of the component(s) 104 or a performance of the component(s) 104, as described herein.

At 406, the computing system may provide, as input to a trained machine learning model(s) 120, data (e.g., test data 118) generated as a result of executing the first test 116(1). The data provided as input to the trained machine learning model(s) 120 at block 406 may include, without limitation, test result data 406(A) indicative of the first test 116(1) having passed or failed, and/or performance data 406(B) indicative of a performance of the component(s) 104 tested by the first test 116(1). For example, performance data 406(B) may include a duration of the first test 116(1) measured from a start of the first test 116(1) to a completion of the first test 116(1). As another example, the performance data 406(B) may include a response time(s) of a component(s) 104 being tested (e.g., how long it took for a component(s) 104 to respond to a stimulus, such as a query or a request message). As yet another example, the performance data 406(B) may indicate whether the component(s) 104 interacted with a predefined set of other components or systems (e.g., middleware systems, backend systems, etc.) as a result of executing the first test 116(1). Additionally, or alternatively, the data provided as input to the trained machine learning model(s) 120 at block 406 may be in any suitable format, such as image data 406(C), in one example. The image data 406(C), for example, may represent a screenshot of a user interface displayed on a display of a component 104 (e.g., a device with a display) tested by the first test 116(1).

At 408, the computing system may classify, using the trained machine learning model(s) 120, and based at least in part on the data provided as input to the trained machine learning model(s) 120 at block 406, one or more tests 116 of the suite 200, 300 of tests 116. For example, the trained machine learning model(s) 120 may output a classification 122 or a score that indicates, or otherwise relates to, a probability of a test 116 being classified in one of multiple classes that indicate a characteristic of the test 116, as described herein.

At 410, the computing system may determine whether to modify the suite 200, 300 of tests 116 based on the classification 122 at block 408. If the computing system determines to modify the suite 200, 300 of tests 116, the process 400 may follow the YES route from block 410 to block 412 where the suite 200, 300 of tests 116 is modified to optimize testing of a wireless carrier's system. If the computing system determines not to modify the suite 200, 300 of tests 116, the process 400 may follow the NO route from block 410 to block 414 where the suite 200, 300 of tests 116 is not modified. Accordingly, the process 400 may be performed to determine whether to modify a suite 200, 300 of tests 116 based on a machine-learned classification 122. For example, if the machine-learned classification 122 indicates that testing can be optimized through modification of a suite 200, 300 of tests 116, the suite 200, 300 of tests can be modified. Else, if there is little-to-no opportunity for optimization, the suite 200, 300 of tests 116 can be left as-is.

Figure 5:
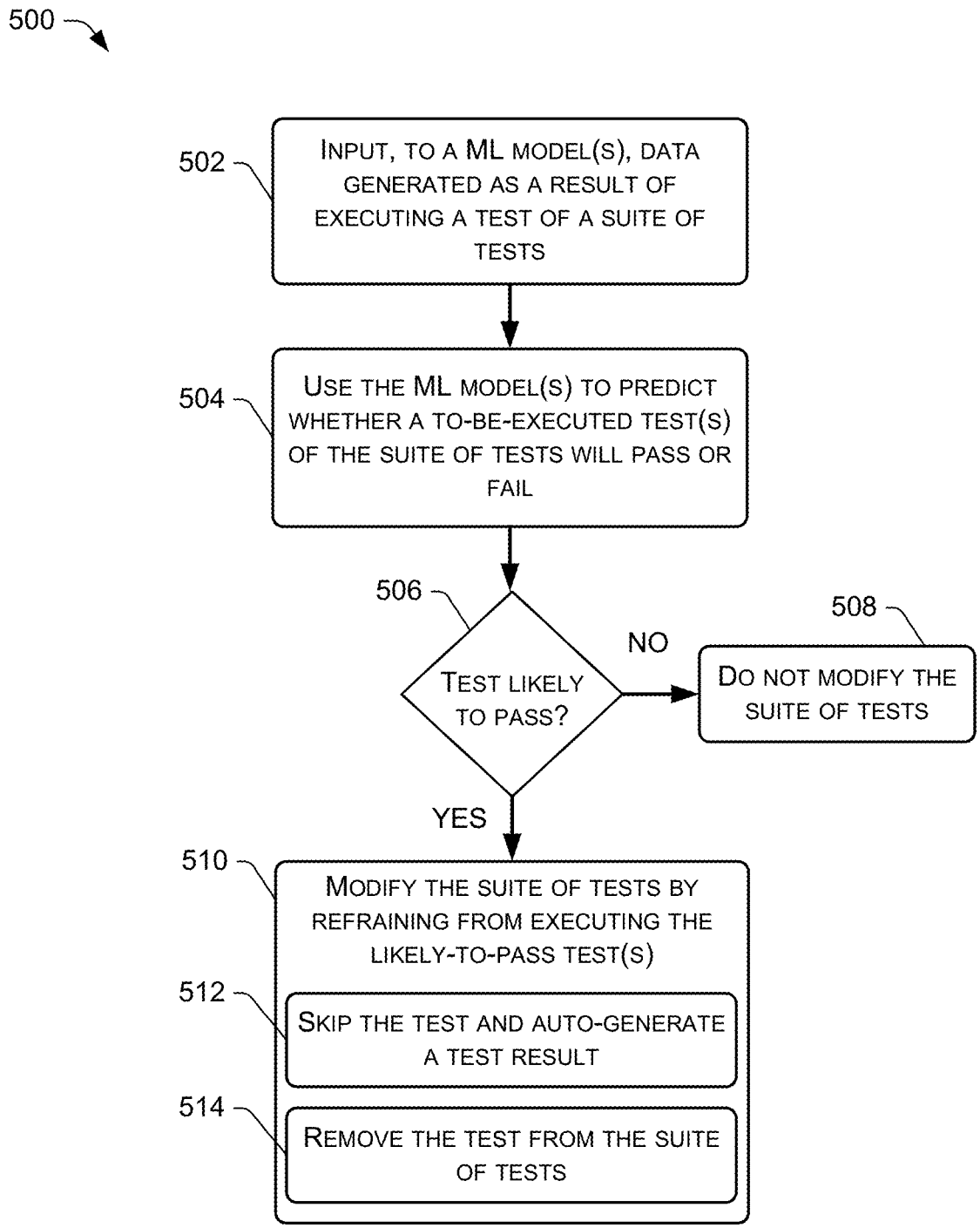
FIG. 5 illustrates a flowchart of an example process for using a trained machine learning model(s) to predict a likelihood of a to-be-executed test passing or failing based on data relating to an already-executed test, and modifying the suite of tests based on the predicted test result of the to-be-executed test, in accordance with various embodiments.

FIG. 5 illustrates a flowchart of an example process 500 for using a trained machine learning model(s) 120 to predict a likelihood of a to-be-executed test of a suite of tests passing or failing based on data relating to an already-executed test, and modifying the suite of tests based on the predicted test result of the to-be-executed test, in accordance with various embodiments. For discussion purposes, reference is made to the previous figures (particularly FIG. 2) in describing the process 500.

At 502, a computing system (e.g., the computing system 106) may input, to a trained machine learning model(s) 120, data (e.g., test data 118(A)) generated as a result of executing a first test 116(1) of a suite 200 of tests 116.

At 504, the computing system may use the trained machine learning model(s) 120 to predict, based at least in part on the data (e.g., test data 118(A)), whether a to-be-executed test 116 (e.g., a second test 116(2)) of the suite 200 of tests 116 will pass or fail when executed.

At 506, if the trained machine learning model(s) 120 predicts that the to-be-executed test 116 (e.g., the second test 116(2)) is likely to fail when executed, the process 500 may follow the NO route from block 506 to block 508 where the computing system refrains from modifying the suite 200 of tests 116 (indicating that tests 116 will continue to be executed). If, at 506, the trained machine learning model(s) 120 predicts that the to-be-executed test 116 (e.g., the second test 116(2)) is likely to pass when executed, the process 500 may follow the YES route from block 506 to block 510.

At 510, the computing system may modify the suite 200 of tests by refraining from executing the to-be-executed test 116 (e.g., the second test 116(2)). At sub-block 512, the modification of the suite 200 may involve skipping the to-be-executed test 116 (e.g., the second test 116(2)) and generating a test result indicative of the to-be-executed test 116 (e.g., the second test 116(2)) having assumed to have been passed. At sub-block 514, the modification of the suite 200 may involve removing the to-be-executed test 116 (e.g., the second test 116(2)) from the suite 200.

Figure 6:
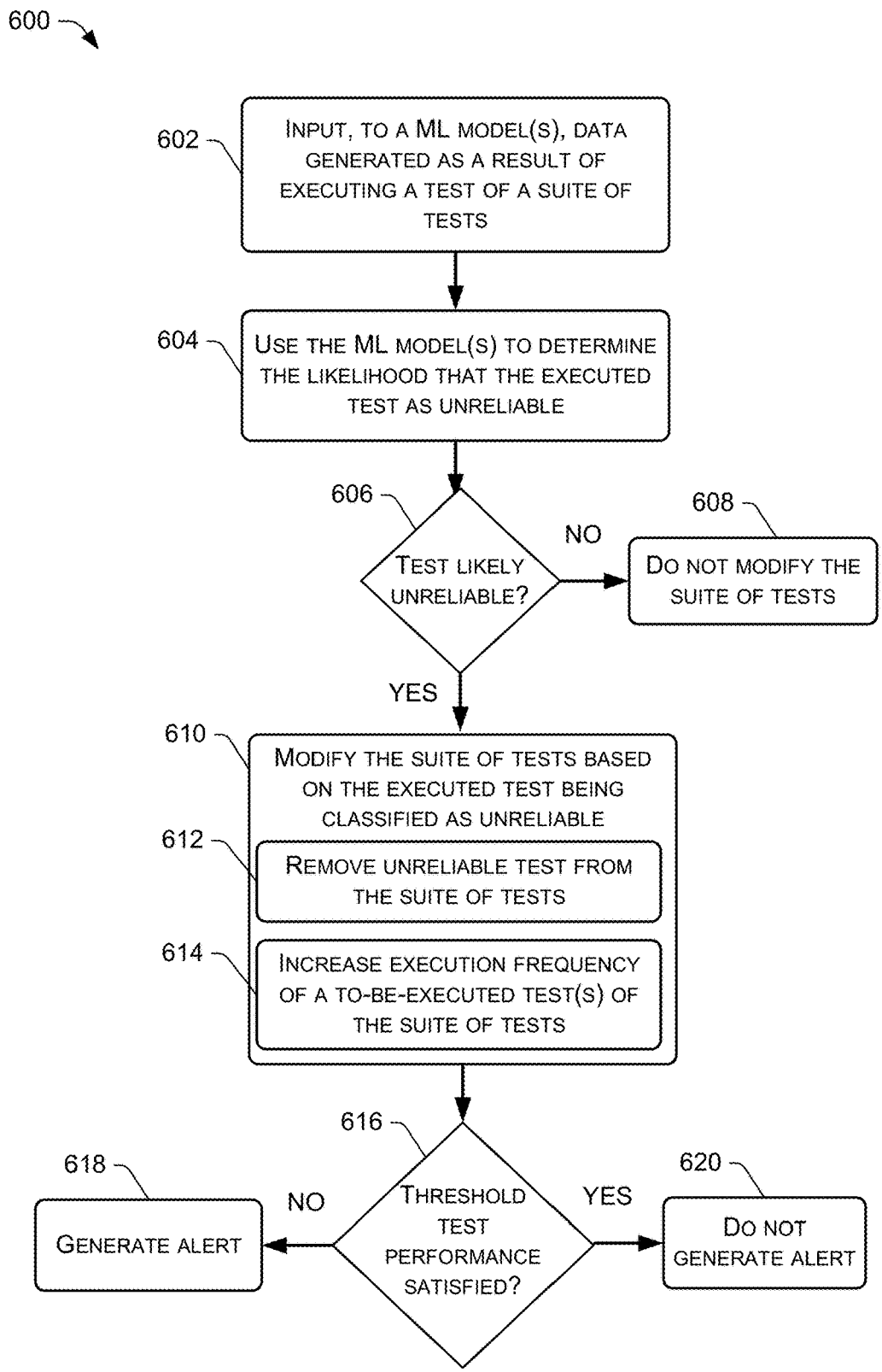
FIG. 6 illustrates a flowchart of an example process for using a trained machine learning model(s) to determine a likelihood than an already-executed test is unreliable based on data relating to the already-executed test, and modifying the suite of tests based on the determined reliability of the already-executed test, in accordance with various embodiments.

FIG. 6 illustrates a flowchart of an example process 600 for using a trained machine learning model(s) 120 to determine a likelihood than an already-executed test of a suite of tests is unreliable based on data relating to the already-executed test, and modifying the suite of tests based on the determined reliability of the already-executed test, in accordance with various embodiments. For discussion purposes, reference is made to the previous figures (particularly FIG. 3) in describing the process 600.

At 602, a computing system (e.g., the computing system 106) may input, to a trained machine learning model(s) 120, data (e.g., test data 118(B)) generated as a result of executing a first test 116(1) of a suite 300 of tests 116.

At 604, the computing system may use the trained machine learning model(s) 120 to determine, based at least in part on the data (e.g., test data 118(B)), a likelihood that the first test 116(1) is unreliable.

At 606, if the trained machine learning model(s) 120 determines that the first test 116(1) is likely a reliable test, the process 600 may follow the NO route from block 606 to block 608 where the computing system refrains from modifying the suite 300 of tests 116. If, at 606, the trained machine learning model(s) 120 determines that the first test 116(1) is likely an unreliable test, the process 600 may follow the YES route from block 606 to block 610.

At 610, the computing system may modify the suite 300 of tests based at least in part on the first test 116(1) being classified as unreliable. At sub-block 612, the modification of the suite 300 may involve removing the first test 116(1) from the suite 300 of tests 116. At sub-block 614, the modification of the suite 300 may involve increasing an execution frequency of a downstream, to-be-executed test 116 (e.g., a second test 116(2)) of the suite 300.

At 616, the computing system may evaluate a test performance threshold to determine if the threshold is satisfied. For example, the data (e.g., test data 118(B)) generated as a result of executing the first test 116(1) may include performance data, among other types of data, and the computing system may, at block 616, determine, based on the performance data, whether a performance metric of the component(s) 104 tested by the first test 116(1) fails to satisfy a threshold. Failing to satisfy a threshold may include failing to meet or exceed the threshold, or failing to strictly exceed the threshold. Alternatively, failing to satisfy a threshold may include meeting or exceeding the threshold, or strictly exceeding the threshold. This is because a lower performance metric may be indicative of better performance in some cases, while in other cases a higher performance metric may be indicative of better performance. If a performance metric of the component(s) 104 tested by the first test 116(1) fails to satisfy a threshold at block 616 (i.e., if the component(s) 104 performed below a threshold performance), the process 600 may follow the NO route from block 616 to block 618 where the computing system may generate an alert based at least in part on the performance metric failing to satisfy the threshold. If the performance metric of the component(s) 104 tested by the first test 116(1) satisfies a threshold at block 616 (i.e., if the component(s) 104 performed at or above a threshold performance), the process 600 may follow the YES route from block 616 to block 620 where the computing system may refrain from generating an alert. Generating an alert at block 618 may allow for a test engineer or other personnel to review the first test 116(1) based on the below-threshold performance.

Figure 7:
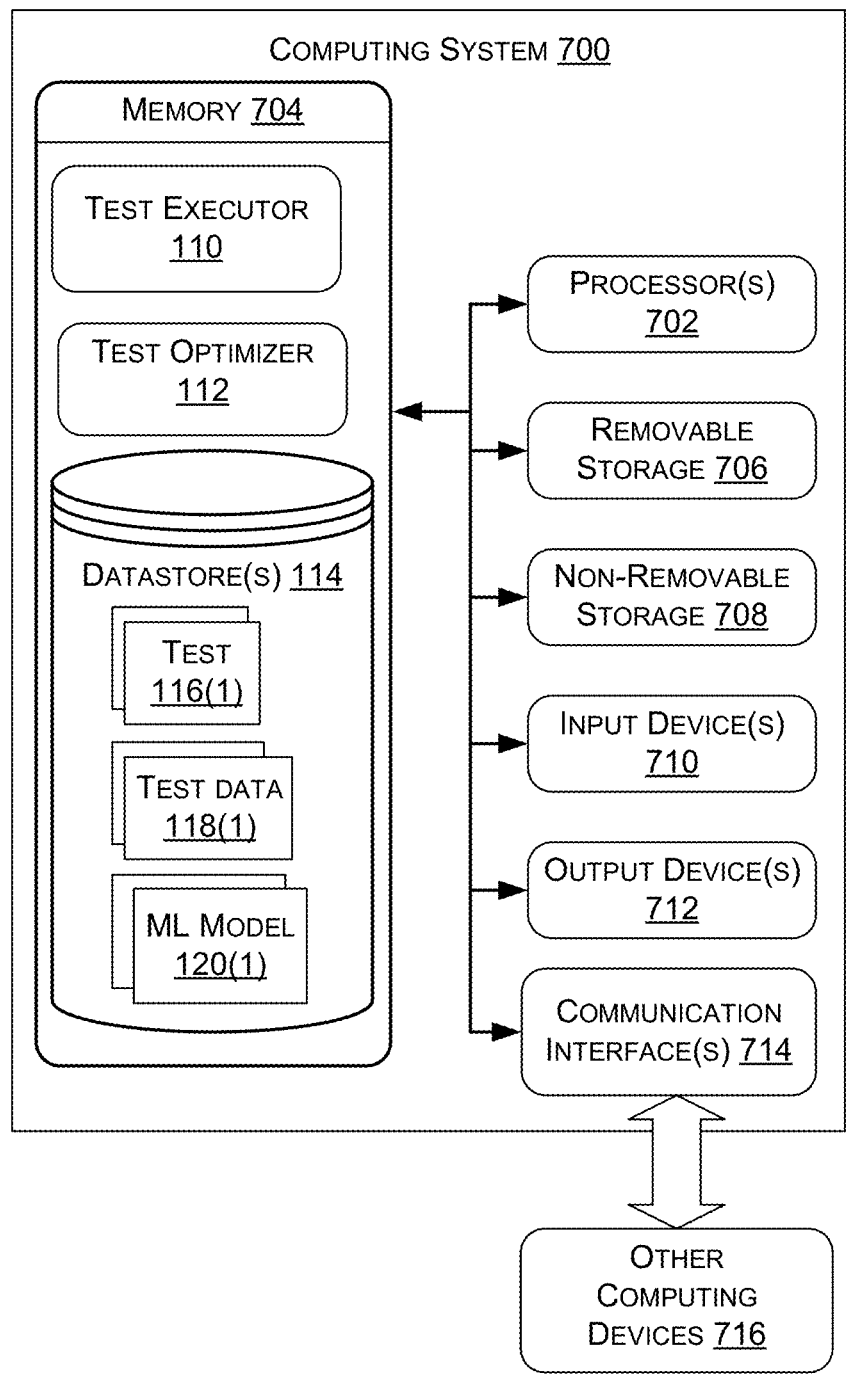
FIG. 7 is a block diagram of an example computing system configured to perform the techniques and processes described herein, in accordance with various embodiments.

FIG. 7 is a block diagram of an example computing system 700 configured to perform the techniques and processes described herein, in accordance with various embodiments. The computing system 700 may the computing system 106 described herein. As shown in FIG. 7, the computing system 700 may include one or more processors 702 and one or more forms of computer-readable memory 704. The computing system 700 may also include additional storage devices. Such additional storage may include removable storage 706 and/or non-removable storage 708.

In various embodiments, the computer-readable memory 704 comprises non-transitory computer-readable memory 704 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 704 may also be described as computer storage media and may include volatile and nonvolatile, removable and non-removable media implemented in any method or technology for storage of information, such as computer readable instructions, data structures, program modules, or other data. Computer-readable memory 704, removable storage 706 and non-removable storage 708 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing system 700. Any such computer-readable storage media may be part of the computing system 700.

The computing system 700 may further include input devices 710 (e.g., a touch screen, keypad, keyboard, mouse, pointer, microphone, etc.) and output devices 712 (e.g., a display, printer, speaker, etc.) communicatively coupled to the processor(s) 702 and the computer-readable memory 704. The computing system 700 may further include a communications interface(s) 714 that allows the computing system 700 to communicate with other computing devices 716 such as via a network(s). The communications interface(s) 714 may facilitate transmitting and receiving wired and/or wireless signals over any suitable communications/data technology, standard, or protocol, as described herein. For example, the communications interface(s) 714 can comprise one or more of a cellular radio, a wireless (e.g., IEEE 802.1x-based) interface, a Bluetooth® interface, and so on.

In some embodiments, the computer-readable memory 704 may include, without limitation, the test executor 110 and the test optimizer 112 described herein. FIG. 7 shows that the memory 704 may include the datastore(s) 114 to store tests 116, test data 118, and trained machine learning models 120, as described herein. It is also to be appreciated that a remote system may include any one or more, or all, of the components and/or data depicted in FIG. 7. Accordingly, it is to be appreciated that some or all aspects of the machine learning techniques can be performed by the remote system external to the computing system 700, or by a combination of a remote system and the computing system 700.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   executing a first test of a suite of tests that are to be executed for testing one or more components of a system operated by a wireless carrier;
   providing, as input to a trained machine learning model, data generated as a result of executing the first test;
   classifying, using the trained machine learning model, and based at least in part on the data, a second test of the suite of tests as a test that is likely to pass when executed;
   and modifying the suite of tests by refraining from executing the second test;
   wherein the data comprises performance data indicative of a performance of the one or more components;
   wherein the performance data indicates whether the one or more components interacted with a predefined set of other components or systems as a result of executing the first test.

2. The computer-implemented method of claim 1, wherein the data comprises performance data indicative of a performance of the one or more components.

3. The computer-implemented method of claim 2, wherein the performance data comprises a duration of the first test measured from a start of the first test to a completion of the first test.

4. The computer-implemented method of claim 1, wherein the data comprises test result data indicative of the first test having passed or failed.

5. The computer-implemented method of claim 1, wherein the one or more components comprise a device having a display, and wherein the data comprises image data representing a screenshot of a user interface displayed on the display of the device.

6. The computer-implemented method of claim 1, wherein the modifying of the suite of tests by refraining from executing the second test comprises at least one of:
   skipping the second test and generating a test result indicative of the second test having assumed to have been passed; or
   removing the second test from the suite of tests.

7. The computer-implemented method of claim 1, wherein each test of the suite of tests are automated tests that are executed by executing a script.

8. The computer-implemented method of claim 1, wherein each test of the suite of tests is executed to test at least one of an availability of the one or more components or a performance of the one or more components.

9. A computer-implemented method comprising:
   executing a first test of a suite of tests that are to be executed for testing one or more components of a system operated by a wireless carrier;
   providing, as input to a trained machine learning model, data generated as a result of executing the first test;
   classifying, using the trained machine learning model, and based at least in part on the data, the first test as unreliable; and
   modifying the suite of tests based at least in part on the first test being classified as unreliable;
   wherein the data comprises performance data indicative of a performance of the one or more components;
   wherein the performance data indicates whether the one or more components interacted with a predefined set of other components or systems as a result of executing the first test.

10. The computer-implemented method of claim 9, wherein the data comprises performance data indicative of a performance of the one or more components.

11. The computer-implemented method of claim 10, wherein the performance data comprises a response time of the one or more components.

12. The computer-implemented method of claim 10, further comprising:
  determining, based on the performance data, that a performance metric of the one or more components fails to satisfy a threshold; and
  generating an alert based at least in part on the performance metric failing to satisfy the threshold.

13. The computer-implemented method of claim 9, wherein the data comprises test result data indicative of the first test having passed or failed.

14. The computer-implemented method of claim 9, wherein the one or more components comprise a device having a display, and wherein the data comprises image data representing a screenshot of a user interface displayed on the display of the device.

15. The computer-implemented method of claim 9, wherein the modifying of the suite of tests comprises at least one of:
  removing the first test from the suite of tests; or
  increasing an execution frequency of a second test of the suite of tests.

16. A system comprising:
  one or more processors; and
  memory storing computer-executable instructions that, when executed by the processor, cause performance of operations comprising:
    executing a first test of a suite of tests that are to be executed for testing one or more components of a system operated by a wireless carrier;
    providing, as input to a trained machine learning model, data generated as a result of executing the first test;
    classifying, using the trained machine learning model, and based at least in part on the data, a second test of the suite of tests as a test that is likely to pass when executed; and
    modifying the suite of tests by refraining from executing the second test;
    wherein the data comprises performance data indicative of a performance of the one or more components;
    wherein the performance data indicates whether the one or more components interacted with a predefined set of other components or systems as a result of executing the first test.

17. The system of claim 16, wherein the modifying of the suite of tests by refraining from executing the second test comprises at least one of:
  skipping the second test and generating a test result indicative of the second test having assumed to have been passed; or
  removing the second test from the suite of tests.

18. The system of claim 16, wherein the data comprises test result data indicative of the first test having passed or failed.

* * * * *